United States Patent
Mermoud et al.

(10) Patent No.: US 12,261,751 B2
(45) Date of Patent: Mar. 25, 2025

(54) LEARNING PROBING STRATEGIES FOR QoE ASSESSMENT

(71) Applicant: Cisco Technology, Inc., San Jose, CA (US)

(72) Inventors: Grégory Mermoud, Venthône (CH); Jean-Philippe Vasseur, Combloux (FR)

(73) Assignee: Cisco Technology, Inc., San Jose, CA (US)

( * ) Notice: Subject to any disclaimer, the term of this patent is extended or adjusted under 35 U.S.C. 154(b) by 123 days.

(21) Appl. No.: 18/117,616

(22) Filed: Mar. 6, 2023

(65) Prior Publication Data
US 2024/0305542 A1    Sep. 12, 2024

(51) Int. Cl.
*H04L 41/16*     (2022.01)
*H04L 41/50*     (2022.01)
*H04L 41/5009*   (2022.01)

(52) U.S. Cl.
CPC .......... *H04L 41/5009* (2013.01); *H04L 41/16* (2013.01); *H04L 41/5012* (2013.01); *H04L 41/5096* (2013.01); *H04L 41/5032* (2013.01)

(58) Field of Classification Search
CPC . H04L 41/5009; H04L 41/16; H04L 41/5012; H04L 41/5018; H04L 41/5029; H04L 41/5032; H04L 41/5054; H04L 41/5067; H04L 41/5096
USPC ................................. 709/203, 220, 224–228
See application file for complete search history.

(56) References Cited

U.S. PATENT DOCUMENTS

| | | | |
|---|---|---|---|
| 7,835,293 B2 | 11/2010 | Cidon et al. | |
| 10,062,036 B2 | 8/2018 | Mermoud et al. | |
| 10,171,332 B2 | 1/2019 | Mermoud et al. | |
| 10,389,613 B2 | 8/2019 | Dasgupta et al. | |
| 10,708,144 B2 | 7/2020 | Mohan et al. | |
| 10,757,121 B2* | 8/2020 | Dasgupta | H04L 63/1425 |
| 11,429,893 B1* | 8/2022 | Tong | G06N 20/00 |

(Continued)

FOREIGN PATENT DOCUMENTS

| | | | | |
|---|---|---|---|---|
| CA | 2727831 A1 * | 12/2009 | | G06N 5/02 |
| CA | 2905996 A1 * | 10/2014 | | G06Q 10/04 |

OTHER PUBLICATIONS

Chung et al. "Gausssian Processes for Informative Exploration in Reinforcement Learning", 2013 IEEE Int'l Conf'n on Robotics and Automation, May 6, 2013, citing pp. 2618-2624. (Year: 2013).*

(Continued)

*Primary Examiner* — Khanh Q Dinh
(74) *Attorney, Agent, or Firm* — BEHMKE INNOVATION GROUP LLC; James M. Behmke; James J. Wong

(57) ABSTRACT

In one embodiment, a device causes, in accordance with a probing strategy, performance of a probing test by one or more agents in a network and with respect to an online application. The device obtains quality of experience measurements for the online application. The device adjusts, using reinforcement learning, the probing strategy based on how well a predictive model was able to predict the quality of experience measurements given results of the probing test. The device repeats the causing, obtaining, and adjusting steps using the probing strategy adjusted by the device, to find a minimally disruptive probing strategy that provides acceptable performance by the predictive model.

20 Claims, 10 Drawing Sheets

(56) References Cited

U.S. PATENT DOCUMENTS

| | | | |
|---|---|---|---|
| 11,478,715 B1* | 10/2022 | Wu | G06N 3/08 |
| 11,553,038 B1* | 1/2023 | Rakshit | G06N 20/00 |
| 2009/0094605 A1* | 4/2009 | Brelsford | G06F 9/4843 |
| | | | 718/100 |
| 2016/0147766 A1* | 5/2016 | Davidoff | G06F 16/9535 |
| | | | 707/725 |
| 2017/0325120 A1 | 11/2017 | Szilagyi et al. | |
| 2021/0092036 A1* | 3/2021 | Jain | H04L 65/80 |
| 2021/0168068 A1 | 6/2021 | Shenoy | |
| 2021/0337555 A1* | 10/2021 | Fan | H04L 41/40 |
| 2022/0210080 A1* | 6/2022 | Nagarajan | H04L 47/2441 |
| 2022/0271999 A1* | 8/2022 | Jeong | H04L 41/16 |
| 2022/0376998 A1* | 11/2022 | Vasseur | H04L 69/326 |
| 2023/0009634 A1* | 1/2023 | Garcarz | H04L 45/02 |
| 2023/0164045 A1* | 5/2023 | Vasseur | H04L 41/142 |
| | | | 709/224 |
| 2023/0379256 A1* | 11/2023 | Hartsook | H04L 41/0895 |
| 2024/0007389 A1* | 1/2024 | Mermoud | H04L 45/123 |
| 2024/0039856 A1* | 2/2024 | Kakko-Chiloff | H04L 41/5025 |

OTHER PUBLICATIONS

Kougioumtzidis, et al., "A Survey on Multimedia Services QoE Assessment and Machine Learning-Based Prediction", vol. 10, 32 pages, IEEE Access.

Silver, et al., "Mastering the game of Go without human knowledge", Nature, vol. 550, 42 pages (2017).

Fawzi, et al., "Discovering faster matrix multiplication algorithms with reinforcement learning", Nature, vol. 610, Oct. 2022, 18 pages.

Silver, et al., "A general reinforcement learning algorithm that masters chess, shogi and Go through self-play", Science, Dec. 7, 2018, vol. 362, Issue 6419, 32 pages.

Duan, et al., "NGBoost: Natural Gradient Boosting for Probabilistic Prediction", Proceedings of the 37h International Conference on Machine Learning, Vienna, Austria, PMLR 108, 2020, 11 pages.

Mamun, et al., "Uncertainty quantification for Bayesian active learning in rupture life prediction of ferritic steels", Scientific Reports 12.1 (2022): 10 pages.

\* cited by examiner

LEARNING PROBING STRATEGIES FOR QoE ASSESSMENT

TECHNICAL FIELD

The present disclosure relates generally to computer networks, and, more particularly, to learning probing strategies for quality of experience (QoE) assessment.

BACKGROUND

For decades, computer networks have used Key Performance Indicator (KPIs) such as delay, loss, and jitter as proxies for the true user experience of online applications. More specifically, network administrators typically set different Service Level Agreements (SLAs) for different applications, under the assumption that there are certain KPI thresholds at which the user experience of an application becomes degraded. For instance, a voice application may be considered to give poor user experience when it violates an SLA such as: latency>300 ms or loss>3% or jitter>50 ms.

However, using SLA violations as a proxy for the true quality of experience (QoE) of an application is often unreliable. For instance, certain audio codecs may be resilient to packet loss up to 30%, meaning that a user may not even perceive a drop in the QoE of the application in many instances, regardless of whether the application experienced an SLA violation. In another example, SLA violations are typically detected using KPIs that are averaged over a defined period of time. This means that a user could still perceive degraded application QoE due to a sharp spike in a KPI metric during a measurement time period that does not qualify as an SLA violation, because the metric averages out to an acceptable level over that time period.

With recent advances in machine learning, it now becomes possible to predict the true quality of experience (QoE) of an application, without having to rely on SLA violations as a proxy. The accuracy of such a QoE prediction model is also largely a function of the telemetry that is collected from the network and used as input to the prediction model. This means that a tradeoff may be made with respect to the accuracy of the model and the overhead on the network associated with the collection of such telemetry.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
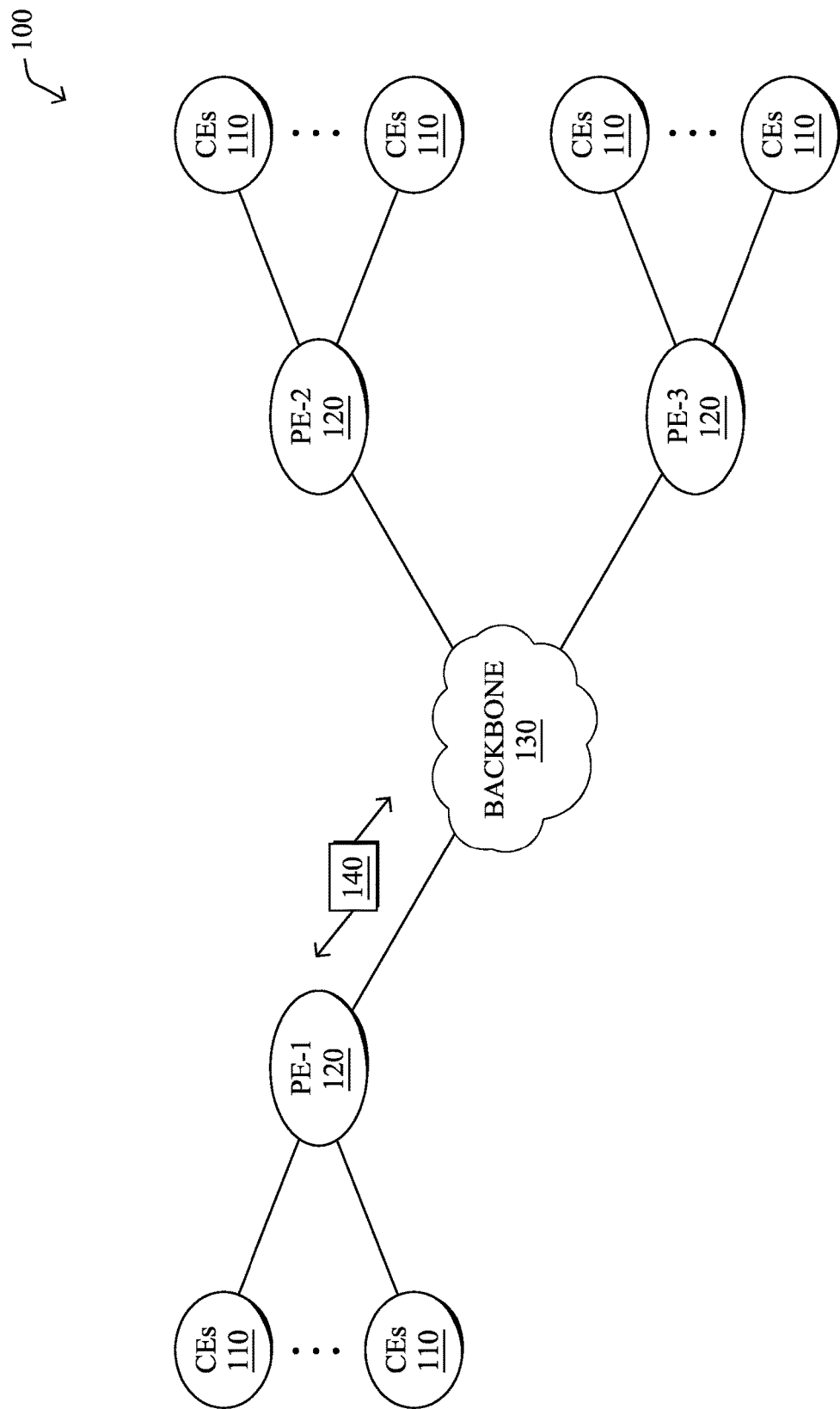
FIGS. 1A-1B illustrate an example communication network.

According to one or more embodiments of the disclosure, a device causes, in accordance with a probing strategy, performance of a probing test by one or more agents in a network and with respect to an online application. The device obtains quality of experience measurements for the online application. The device adjusts, using reinforcement learning, the probing strategy based on how well a predictive model was able to predict the quality of experience measurements given results of the probing test. The device repeats the causing, obtaining, and adjusting steps using the probing strategy adjusted by the device, to find a minimally disruptive probing strategy that provides acceptable performance by the predictive model.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
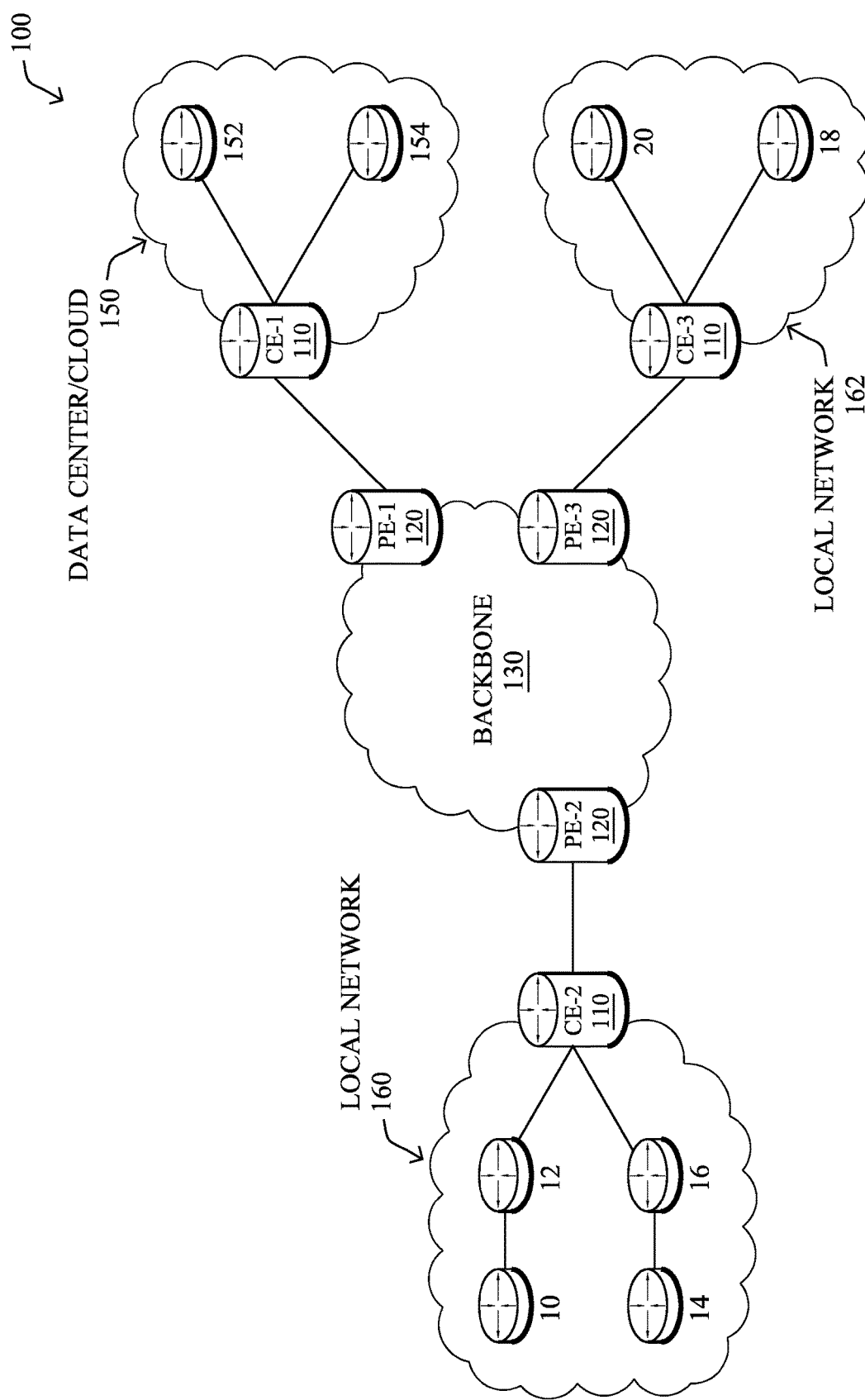

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
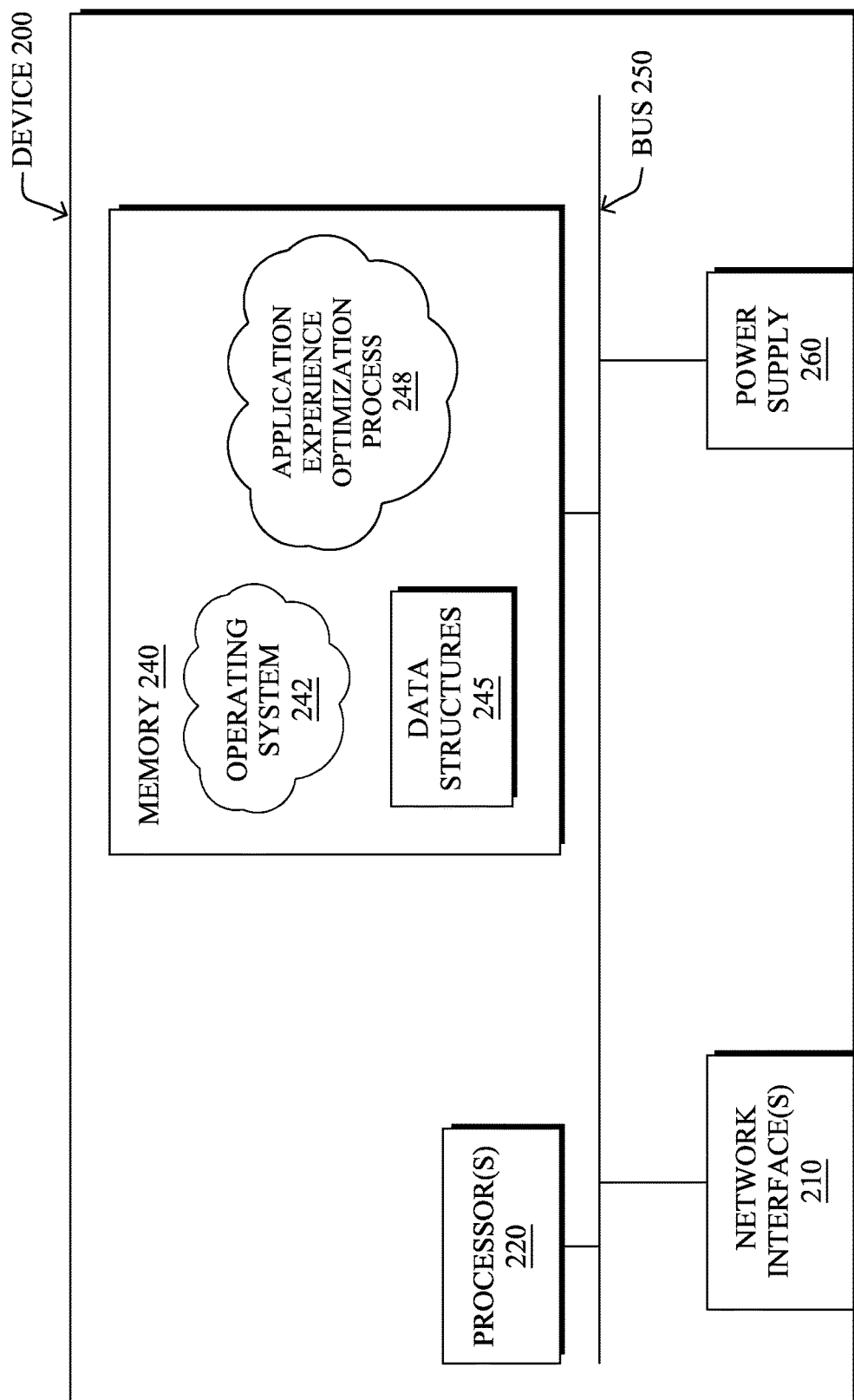
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 and/or data denoising process may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
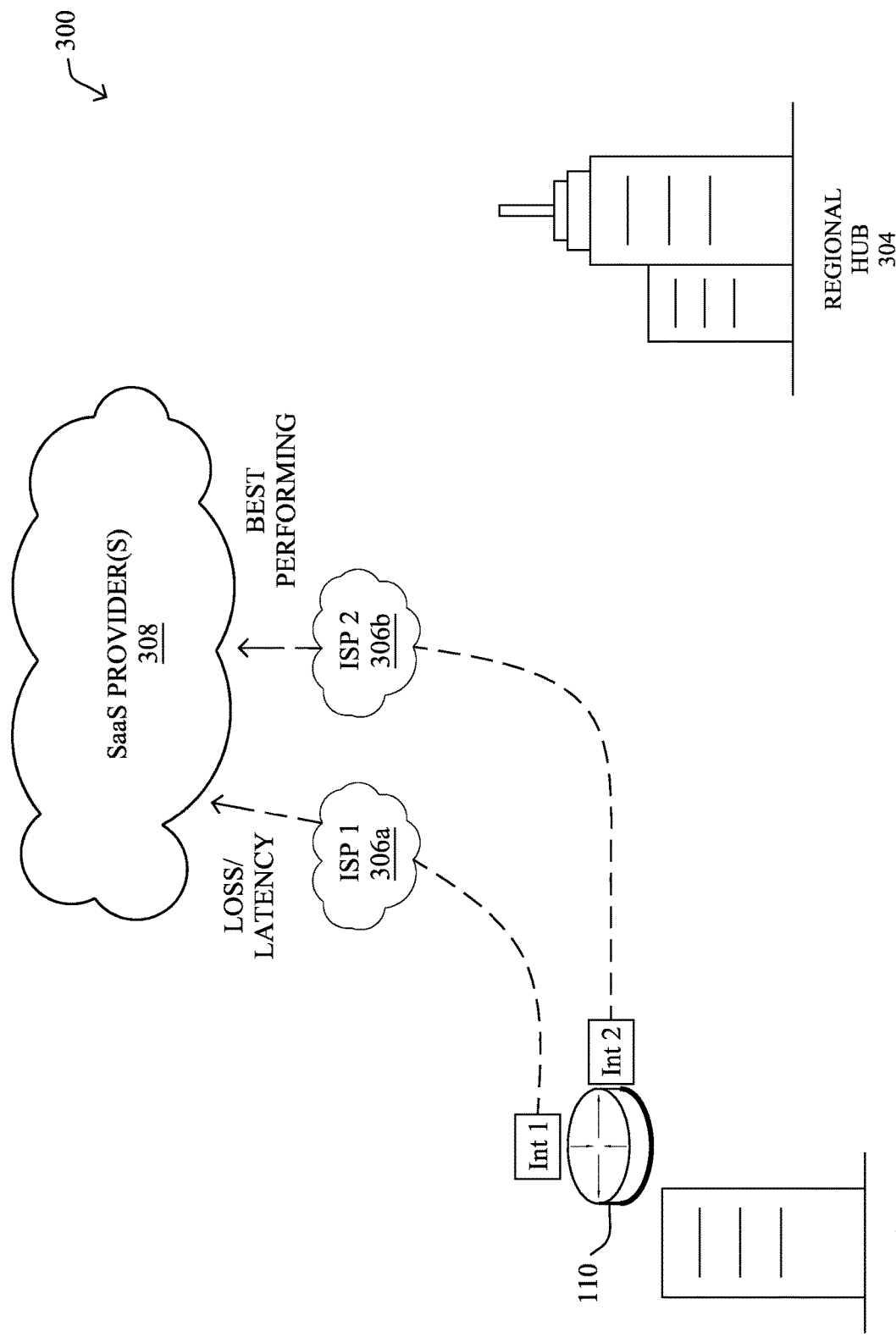
FIGS. 3A-3B illustrate example network deployments.
Figure 3B:
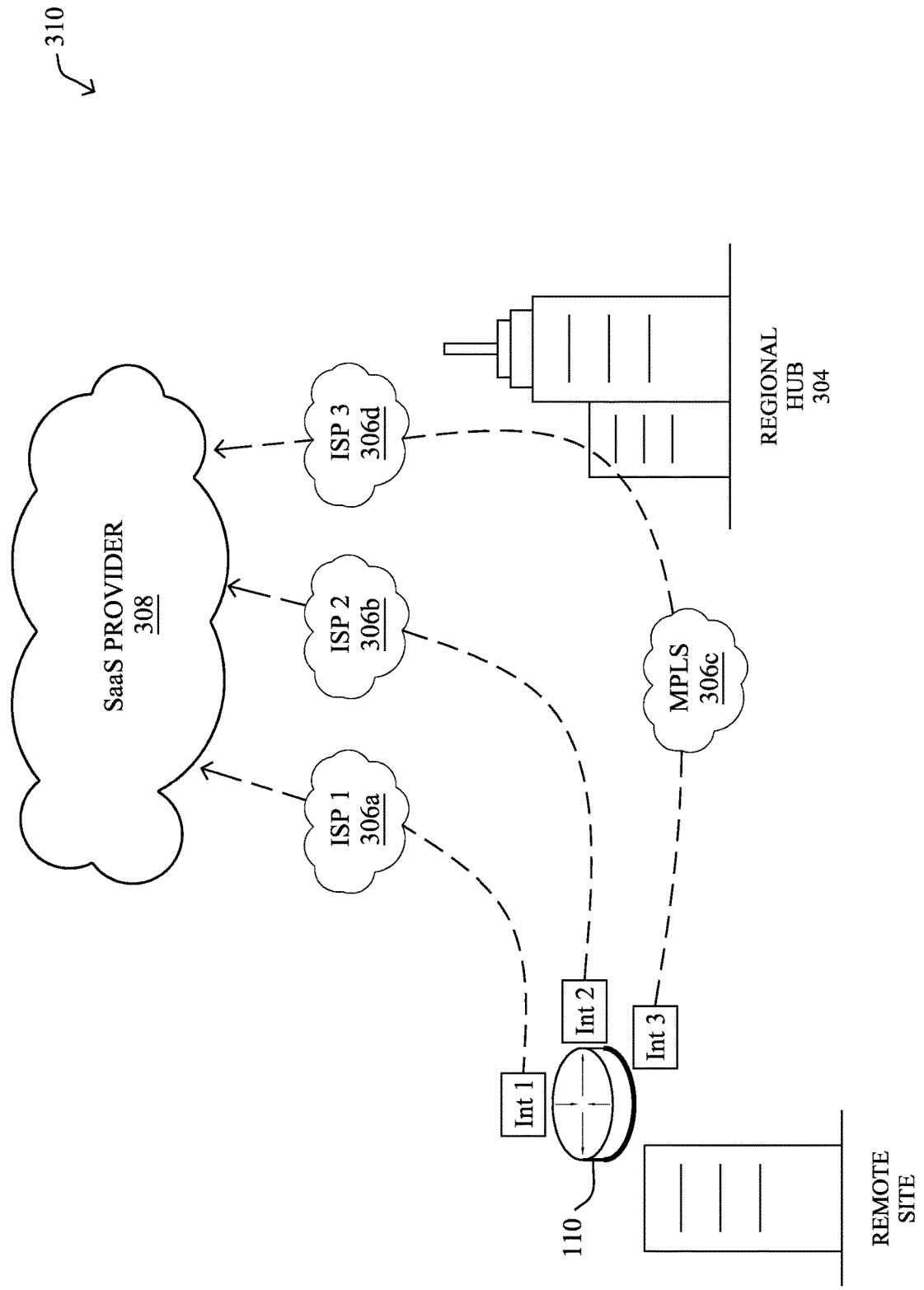

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
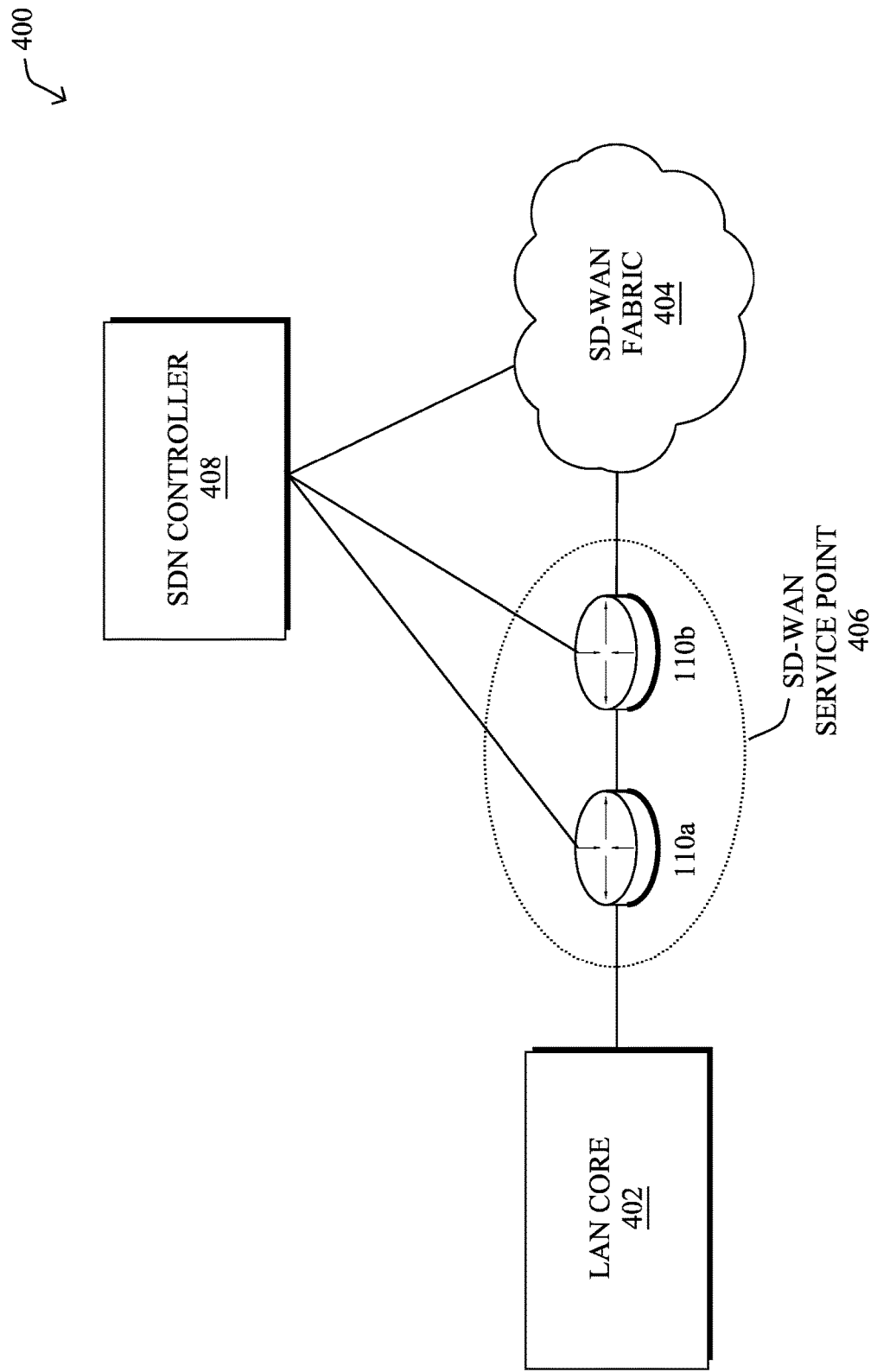
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side. SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet. MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.
Routing is still entirely reactive: decisions are made using probes that reflect the status of a path at a given time, in contrast with the notion of an informed decision.
SLA failures are very common in the Internet and a good proportion of them could be avoided (e.g., using an alternate path), if predicted in advance.

Figure 4B:
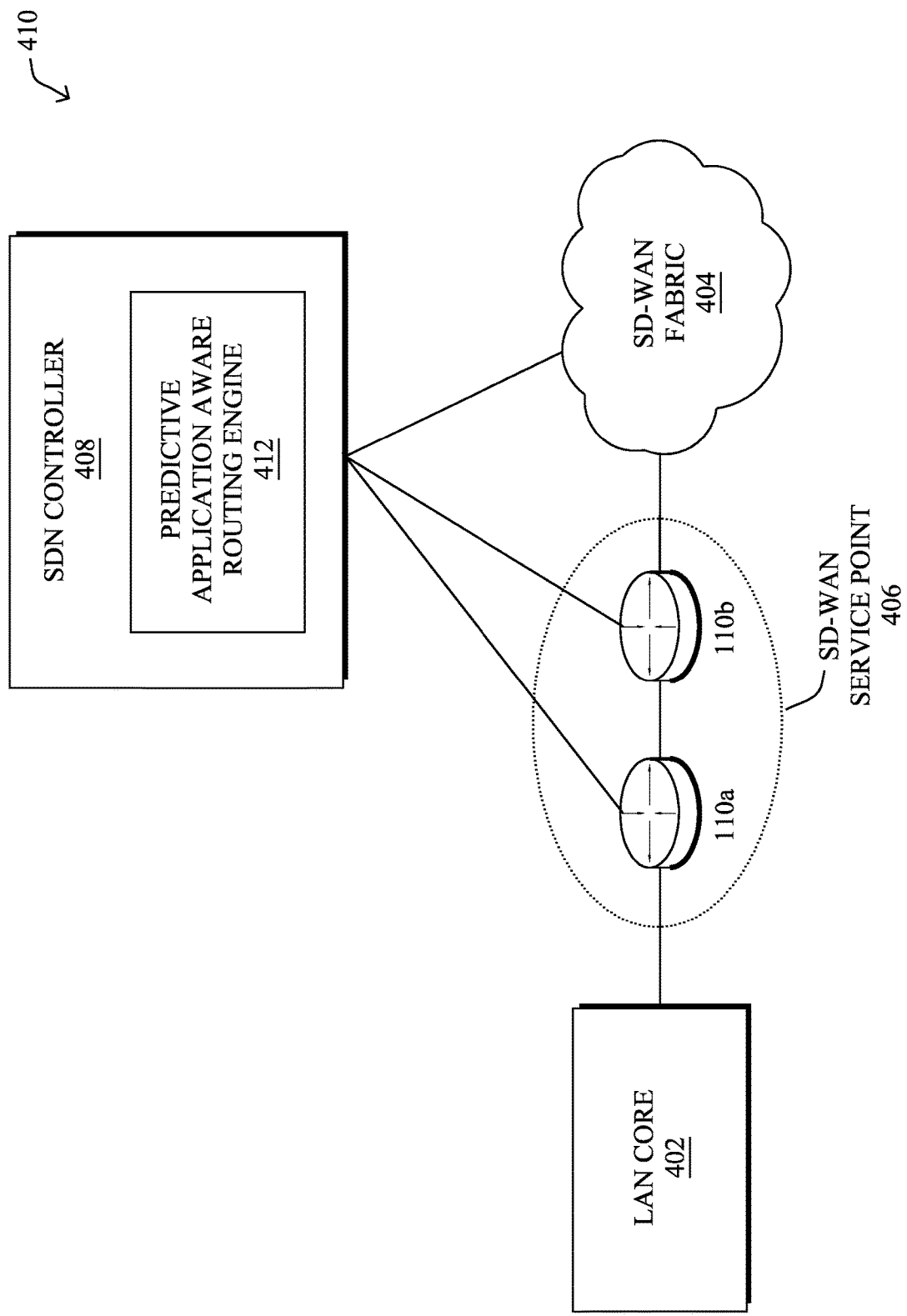

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b. SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, it now becomes possible to leverage machine learning to predict the true QoE of an online application based on telemetry collected from the network and/or the application itself. By most standards, network probing is the technique of choice, to obtain such telemetry. Technologies such as Application Response Time rely on traffic analysis (e.g., TCP control packets) to determine potential issues (e.g., detection of mitigation strategies in TCP indicating network congestion). Active probing strategies include Cisco IP SLA, which endows routers and switches with the ability to run a variety of tests, ranging from simple Internet Control Message Protocol (ICMP) echo (ping) to full-blown HTTP tests and File Transfer Protocol (FTP) downloads. Probing platforms such as ThousandEyes have made such probing tests even more widespread and easy to manage.

Yet, as the industry moves towards new protocols such as HTTPS/3 (HTTP over QUIC), DoT (DNS over TLS), DoH (DNS over HTTPS), and more opacity in both network and application infrastructure (especially from Web Scalers such as Amazon, Microsoft, and Google), thereby reducing the visibility of network operators (both on the enterprise and service provider sides) into the application experience. In addition, there exists a tradeoff between 1.) application-level tests that allow deeper insights into the application (e.g., HTTP tests), but are often not properly targeted (e.g., using a so-called proxy set up by the application provider, which may or may not be representative of the actual application infrastructure) and (2) network-level tests that can be targeted to a broader set of targets (e.g., ICMP tests), but are in principle less correlated with the actual application performance.

Learning Probing Strategies for QoE Assessment

The techniques herein allow for the learning of (near) optimal strategies of network probing that are adaptive to the network conditions and the application of interest. In some aspects, the system may rely on reinforcement learning, to learn from repeated trials and errors from programmable test agents deployed at large scale.

Illustratively, the techniques described herein may be performed by hardware, software, and/or firmware, such as in application experience optimization process 248, which may include computer executable instructions executed by the processor 220 (or independent processor of interfaces 210) to perform functions relating to the techniques described herein.

Specifically, according to various embodiments, a device causes, in accordance with a probing strategy, performance of a probing test by one or more agents in a network and with respect to an online application. The device obtains quality of experience measurements for the online application. The device adjusts, using reinforcement learning, the probing strategy based on how well a predictive model was able to predict the quality of experience measurements given results of the probing test. The device repeats the causing, obtaining, and adjusting steps using the probing strategy adjusted by the device, to find a minimally disruptive probing strategy that provides acceptable performance by the predictive model.

Figure 5:
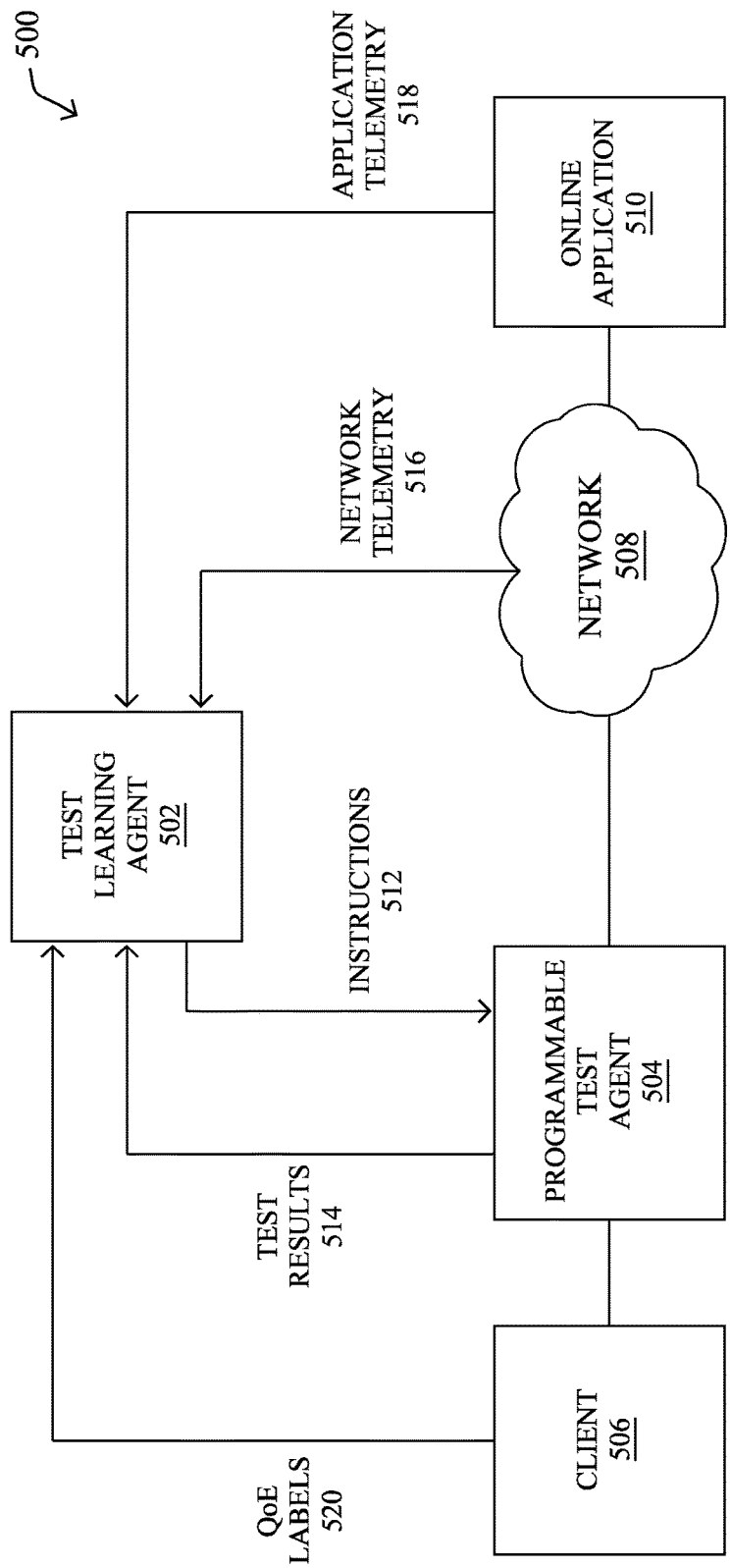
FIG. 5 illustrates an example architecture for learning probing strategies for quality of experience (QoE) assessment.

Operationally, FIG. 5 illustrates an example architecture 500 for learning probing strategies for quality of experience (QoE) assessment, according to various embodiments. As shown, architecture 500 may include a test learning agent 502 that oversees the operations of any number of programmable test agents 504 distributed throughout a network 508. In general, agents 502-504 may be implemented through the execution of suitable software (e.g., application experience optimization process 248) by a specifically-configured device. For instance, test learning agent 502 may be executed by a server in the cloud or data center, a network controller, or the like. Similarly, programmable test agent 504 may be executed by a networking device (e.g., a router, switch, gateway, etc.), client 506 itself, or the like.

In general, client 506 may communicate with a particular online application 510 via network 508. Thus, programmable test agents 504 may exist along the path between client 506 and particular online application 510. Typically, programmable test agent 504 may be hosted at the edge of the local network of client 506, allowing it to probe the network path connecting client 506 and online application 510.

In some embodiments, programmable test agent 504 may be similar in operation to an existing IP SLA or ThousandEyes agent, with the main difference being also able to probe at very high frequencies (e.g., up to tens of probes per second or even more) in a fully programmable fashion. Furthermore, programmable test agent 504 may also be capable of running complex tests whose progress depends on the outcome of previous probes. As would be appreciated, programmable test agent 504 may perform any number of different types of probing tests, such ICMP-like tests or those in accordance with various protocols such as, but not limited to, HTTP, TCP, DNS, UDP, and the like.

During operation, test learning agent 502 may send instructions 512 to programmable test agent 504. In some embodiments, instructions 512 may not be limited to simply a target and type of pre-configured test to fun, but may take the form of executable instructions, possibly in the form of scripted programs (e.g., Python, JavaScript, etc.). These programs (called tests hereafter) are not intended to be written by a human operator, although this is of course a possibility, in further embodiments. Preferably, though, test learning agent 502 may generate them using machine learning, with the objective of the tests to garner an accurate assessment of the QoE of application users of online application 510.

In various embodiments, test learning agent 502 may centrally coordinate the probing tests to be performed by any number of programmable test agents throughout network 508 such as programmable test agent 504. In some embodiments, test learning agent 502 may do so using the following strategy:

Generate a new test T of application A.
Execute test T on a set S of programmable test agents.
Receive results from all agents.
Adjust internal model based on results.
Repeat.

This loop can be seen as an example of a reinforcement learning strategy, whereby an actor performs an action in an environment to achieve a given objective. Here, programmable test agent 504 is the actor, network 508 is the test environment, and the objective is to evaluate the QoE of users of online application 510. Of course, the challenge with respect to reinforcement learning is obtaining enough data from the environment to achieve an acceptable performance (because of the sheer volume of samples, that is, outcomes of an action to optimize for a given target). More specifically, in various embodiments, test learning agent 502 may coordinate probing tests at scale (possibly on millions of deployed test agents) and learn from the outcome of these tests.

In various embodiments, the objective of this reinforcement learning is to find a minimally disruptive probing strategy that allows for acceptable accuracy in the assessment of the QoE of online application 510, such as by minimizing the number of packets and/or bandwidth consumed by its resulting probing tests. This can be done, for instance, by seeking a probing strategy that affords at least a threshold accuracy or, alternatively, a probing strategy that also maximizes the accuracy of the QoE assessment.

To this end, test learning agent 502 may obtain application-level telemetry 518 (e.g., concealment time, jitter buffer delay for conference applications, SpeedIndex and/or Page Load Time metrics for web applications, etc.) and/or QoE labels 520, that may serve as the "targets" for a QoE prediction model whose inputs are the probing test results 514. In various embodiments, QoE labels 520 may take the form of feedback provided by actual users of online application 510 regarding their satisfaction with online application 510, such as responses to surveys or the like (e.g., asking the users to rate their experiences on a defined scale, etc.). In another embodiment, QoE labels 520 could also be obtained by having bots provide such labels.

Figure 6:
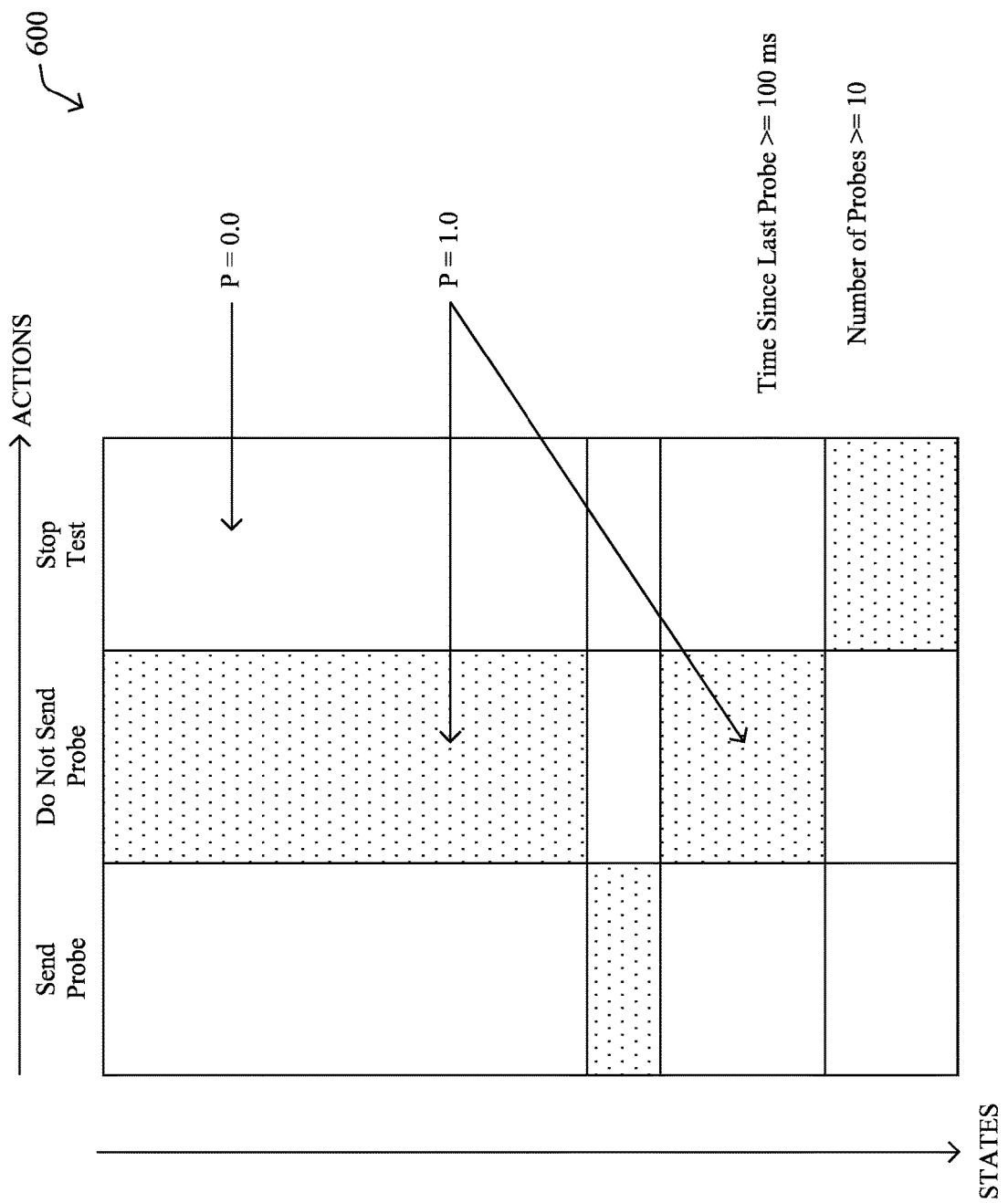
FIG. 6 illustrates an example matrix of different probing strategies.

Said differently, test learning agent 502 may use the probing test results 514 of a set of one or more probing tests as input to a QoE prediction model and then assess the accuracy of the prediction by comparing it to application-level telemetry 518 and/or QoE labels 520. For instance, if the test results of a particular probing test lead the QoE model to predict acceptable QoE for online application 510, but the In a simple embodiment, test learning agent 502 may search for ICMP (adaptive) probing strategies. The search space is much smaller than it may appear at first sight: there are only three possible actions: 1.) send a probe, 2.) not send a probe, and 3.) stop the test, and the state can be reduced significantly by summarizing the outcome of past probes. For the sake of illustration, test learning agent 502 may consider only a few variables, such as the number of probes sent, the time since the last probe was sent, the maximum delay, and the number of lost probes. As a result, the state space only has 3-dimensions. For the sake of simplicity, assume that test learning agent 502 makes an evaluation every 10 ms and that it must pick an action at every evaluation. In such a case, test learning agent 502 may encode a matrix of action-state pairs whose entries represent probabilities to take each action in every state (such that rows sum to 1.0). FIG. 6 illustrates an example matrix 600 that uses this approach.

As shown in FIG. 6, matrix 600 may be a probabilistic matrix of action-state pairs. Here a trivial strategy is encoded that consists in sending ten successive probes every 100 milliseconds. Such a test can be thought of as a single player game whose outcome (i.e., reward to the agent) is the ability to predict the QoE of users of an application whose traffic is flowing along the tested path. Test learning agent 502 may use a variety of strategies to search the space of all tests as encoded by matrix 600. In some embodiments, it may use metaheuristics such as Particle Swarm Optimization, Genetic Algorithms or Bayesian Search, with some bias towards solutions that are less impactful on the network. In turn, it may evaluate the reward by evaluating a predictive model whose input features are the test results against baseline QoE models or heuristics that leverage cross-layer telemetry.

The basic idea is that, if a network-only test can compete with a score based on cross-layer telemetry, the test is highly valuable for visibility purposes, as it allows evaluation in situations where said telemetry is unavailable. Examples of such tests might be to start with a short, but aggressive probing at high frequency, then followed by a more "focused" phase depending on the result of the initial phase. Such complex probing strategies can be encoded in a matrix such as matrix 600.

In other embodiments, test learning agent 502 may perform a more systematic search based on Monte Carlo tree search, guided by a deep neural network that takes as input a state and outputs a policy (that is, a probability distribution over the allowed actions) and a predicted reward for that policy. Doing so would allow it to run tests at scale with agents deployed on millions of endpoints, routers, switches, etc. whereby the test agents may even be allowed to use different protocols such as HTTP and the state space is expanded significantly (accounting for instance for more moments of the latency, jitter, and loss).

In yet another embodiment, test learning agent 502 may be constrained to build strategies composed of two stages: one "surveillance" mode with strict bandwidth and packet count constraints, and one "validation" mode with looser constraints. Such probing strategies are then "always-on" and are capable of detecting early signs of QoE problems and switching to more aggressive probing to confirm the problem. In this embodiment, the reward of the system might be also different, as the problem is no longer to merely confirm whether a given path may yield poor experience for a given application, but also to be able to detect "transitions" between good conditions and disruptions.

In some embodiments, test learning agent 502 may also be configured to discover and account for any potential constraints on the devices executing the programmable test agents, such as the device that executes programmable test agent 504. Indeed, the local resources of the executing devices may vary across devices (e.g., CPU, memory, etc.) but also in terms of capacity (available bandwidth connecting the device to the network). To this end, each programmable test agent 504 may include a local resource discovery function that evaluates the local resources available to it such as, but not limited to, the percentage of CPU utilization, memory, maximal bandwidth available for probing, etc. In a simple embodiment, a network administrator could configure this discovery function according to the device type (e.g., laptop, dedicated VPN router, etc.) and setup (e.g., uplink is fiber, ADSL, etc.). In another embodiment, such resource discovery may be automated whereby programmable test agent 504 automatically monitors the usage of local resources (CPU, memory, bandwidth, etc.) and dynamically increases it until the user traffic becomes degraded, indicating that programmable test agent 504 is taking up too much bandwidth, the executing device's CPU load or memory pressure becomes too high, or the like.

When such limits are met, programmable test agent 504 may send these limits to test learning agent 502, along with details about the executing device (e.g., type of device, model, software version), its connectivity (e.g., type of uplink, service provider, localization), and/or any other attributes that may influence the constraints. Then, test learning agent 502 may use these attributes and the corresponding limits of resources to constrain the search space of probing tests. Most importantly, this allows test learning agent 502 to customize tests according to the target device, such that it produces differentiated probing strategies for small-factor edge routers with limited connectivity or enterprise-grade routers with gigabit uplinks.

Another potential function of test learning agent 502 may also be to maintain a database of probing tests and make their corresponding probing strategies available to network operators for deployment in their networks. Such information may be in a format that can be interpreted by the programmable test agents, but test learning agent 502 may also translate this machine-targeted format to a human-interpretable form, for instance by converting it to pseudo-code or visualizing some sample traces. Test learning agent 502 could further offers APIs to existing network observability platforms, such as ThousandEyes or the like, so that they can run these tests as part of their own offering.

Optionally, test learning agent 502 may also select probing strategies for testing using a so-called active learning strategy, which consists in maximizing the expected information gain from a given sample. To this end, test learning agent 502 may keep track of past test outcomes on each programmable test agent and then use a statistical estimation method (often based on a predictive model) to predict the information gain from running a test T on an agent A, which is denoted IG(T, A, t), possibly at a given time t. Such predictions could be made using a regression model, which takes as input attributes that characterize the programmable test agent (e.g., location, type of device, or contextual attributes), and predicts some fitness score that assesses the quality of the test (i.e., its ability to assess the QoE, in this case). By using models that perform an efficient prediction with epistemic uncertainty estimate (e.g., quantile regression, NGBoost, Gaussian Processes, etc.), test learning agent 502 can target those agents where the expected information gain is the largest, that is, where the uncertainty on the predictions of the model is the largest. Test learning agent 502 could also use this model an operational tool whereby its predictions are used to help users select the most suitable probing strategy for a given application.

Figure 7:
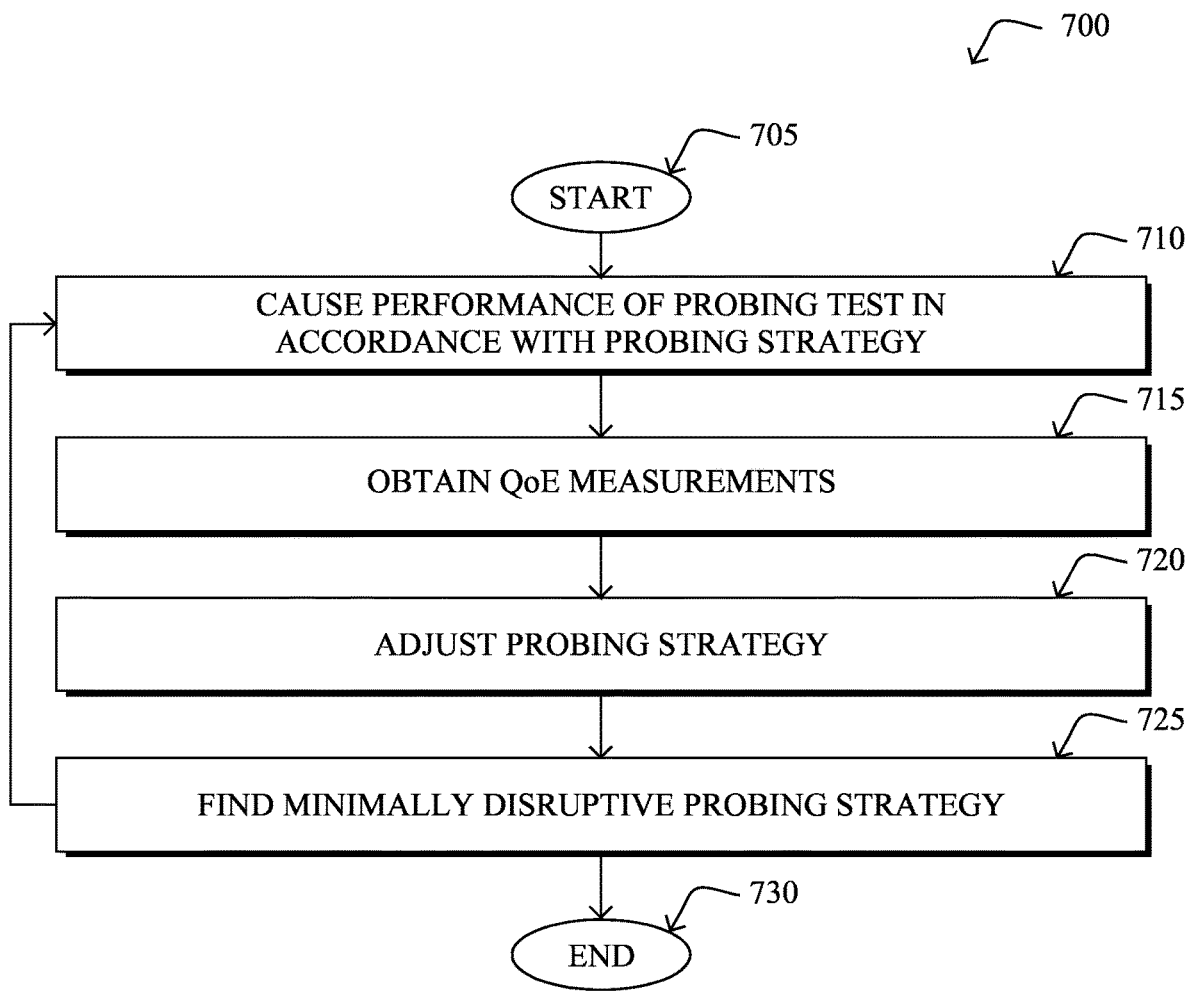
FIG. 7 illustrates an example simplified procedure for learning probing strategies for quality of experience (QoE) assessment.

FIG. 7 illustrates an example simplified procedure 700 (e.g., a method) for learning probing strategies for quality of experience (QoE) assessment, in accordance with one or more embodiments described herein. For example, a non-generic, specifically configured device (e.g., device 200), such as controller for a network (e.g., an SDN controller, a cloud-based device, etc.), an edge router, or other device in communication with a network, may perform procedure 700 by executing stored instructions (e.g., application experience optimization process 248). The procedure 700 may start at step 705, and continues to step 710, where, as described in greater detail above, the device may cause, in accordance with a probing strategy, performance of a probing test by one or more agents in a network and with respect to an online application. In some embodiments, the results of the probing test comprise network-level and application-level telemetry. In further embodiments, the application-level telemetry comprises at least one of: a page load time, a page speed time, or a concealment time. In some cases, the device may also select the one or more agents based on resources available at one or more networking nodes that execute the one or more agents. In one embodiment, the one or more agents are executed by one or more edge routers in the network.

At step 715, as detailed above, the device may obtain quality of experience measurements for the online application. In some embodiments, the quality of experience metrics are based on feedback provided by users of the online application.

At step 720, the device may adjust, using reinforcement learning, the probing strategy based on how well a predictive model was able to predict the quality of experience measurements given results of the probing test, as described in greater detail above. In one embodiment, the device adjusts the probing strategy based on an information gain metric. In some embodiments, the probing strategy comprises a surveillance mode of probing and a validation mode of probing, wherein the surveillance mode of probing has a stricter packet count constraint or bandwidth constraint than that of the validation mode of probing. In further embodiments, the device adjusts the probing strategy based in part on prior probing strategies used by the device to cause performance of prior probing tests in the network with respect to the online application.

At step 725, as detailed above, the device may repeat steps 710-715 above using the probing strategy adjusted by the device, to find a minimally disruptive probing strategy that provides acceptable performance by the predictive model. In various embodiments, the minimally disruptive probing strategy uses a minimal number of packets or bandwidth to conduct probing tests in accordance with it.

Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for learning probing strategies for QoE assessment, it is to be understood that various other adaptations and modifications may be made within the spirit and scope of the embodiments herein. For example, while certain embodiments are described herein with respect to using certain models for purposes of predicting application experience metrics, application QoE, disruptions in a network, etc., the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
causing, by a device and in accordance with a probing strategy, performance of a probing test by one or more agents in a network and with respect to an online application;
obtaining, by the device, quality of experience measurements for the online application;
adjusting, by the device and using reinforcement learning, the probing strategy based on how well a predictive model was able to predict the quality of experience measurements given results of the probing test; and
repeating the causing, obtaining, and adjusting steps using the probing strategy adjusted by the device, to find a minimally disruptive probing strategy that provides acceptable performance by the predictive model.

2. The method as in claim 1, wherein the quality of experience metrics are based on feedback provided by users of the online application.

3. The method as in claim 1, wherein the results of the probing test comprise network-level and application-level telemetry.

4. The method as in claim 3, wherein the application-level telemetry comprises at least one of: a page load time, a page speed time, or a concealment time.

5. The method as in claim 1, wherein the minimally disruptive probing strategy uses a minimal number of packets or bandwidth to conduct probing tests in accordance with it.

6. The method as in claim 1, further comprising:
selecting the one or more agents based on resources available at one or more networking nodes that execute the one or more agents.

7. The method as in claim 1, wherein the device adjusts the probing strategy based on an information gain metric.

8. The method as in claim 1, wherein the probing strategy comprises a surveillance mode of probing and a validation mode of probing, wherein the surveillance mode of probing has a stricter packet count constraint or bandwidth constraint than that of the validation mode of probing.

9. The method as in claim 1, wherein the device adjusts the probing strategy based in part on prior probing strategies used by the device to cause performance of prior probing tests in the network with respect to the online application.

10. The method as in claim 1, wherein the one or more agents are executed by one or more edge routers in the network.

11. An apparatus, comprising:
one or more network interfaces;
a processor coupled to the one or more network interfaces and configured to execute one or more processes; and
a memory configured to store a process that is executable by the processor, the process when executed configured to:
perform a causing operation that causes, in accordance with a probing strategy, performance of a probing test by one or more agents in a network and with respect to an online application;
perform an obtaining operation that obtains quality of experience measurements for the online application;
perform an adjusting operation that adjusts, using reinforcement learning, the probing strategy based on how well a predictive model was able to predict the quality of experience measurements given results of the probing test; and
repeat the causing operation, the obtaining operation, and the adjusting operation using the probing strategy adjusted by the apparatus, to find a minimally disruptive probing strategy that provides acceptable performance by the predictive model.

12. The apparatus as in claim 11, wherein the quality of experience metrics are based on feedback provided by users of the online application.

13. The apparatus as in claim 11, wherein the results of the probing test comprise network-level and application-level telemetry.

14. The apparatus as in claim 13, wherein the application-level telemetry comprises at least one of: a page load time, a page speed time, or a concealment time.

15. The apparatus as in claim 11, wherein the minimally disruptive probing strategy uses a minimal number of packets or bandwidth to conduct probing tests in accordance with it.

16. The apparatus as in claim 11, wherein the process when executed is further configured to:
select the one or more agents based on resources available at one or more networking nodes that execute the one or more agents.

17. The apparatus as in claim 11, wherein the apparatus adjusts the probing strategy based on an information gain metric.

18. Apparatus as in claim 11, wherein the probing strategy comprises a surveillance mode of probing and a validation mode of probing, wherein the surveillance mode of probing has a stricter packet count constraint or bandwidth constraint than that of the validation mode of probing.

19. Apparatus as in claim 11, wherein the apparatus adjusts the probing strategy based in part on prior probing strategies used by the apparatus to cause performance of prior probing tests in the network with respect to the online application.

20. A tangible, non-transitory, computer-readable medium storing program instructions that cause a device to execute a process comprising:
causing, by the device and in accordance with a probing strategy, performance of a probing test by one or more agents in a network and with respect to an online application;
obtaining, by the device, quality of experience measurements for the online application;
adjusting, by the device and using reinforcement learning, the probing strategy based on how well a predictive model was able to predict the quality of experience measurements given results of the probing test; and
repeating the causing, obtaining, and adjusting steps using the probing strategy adjusted by the device, to find a minimally disruptive probing strategy that provides acceptable performance by the predictive model.

* * * * *